United States Patent Office 2,748,078
Patented May 29, 1956

2,748,078

FIRE EXTINGUISHING FOAM-FORMING COMPOSITION

Joseph M. Perri, West Chester, and Benjamin Sloviter, Philadelphia, Pa., assignors to National Foam System, Inc., West Chester, Pa., a corporation of Delaware No Drawing. Application January 15, 1953, Serial No. 331,499

3 Claims. (Cl. 252—8.05)

This invention relates generally to fire-extinguishing compositions and more particularly to such compositions as are capable, when combined with water and air, of producing a stabilized foam which is nonsupporting of combustion and serves as a blanket to smother and extinguish fires of flammable liquids, including not only oil and gasoline but also those of the oxygen-containing polar solvent type such as are principally represented by alcohols, esters, ketones and ethers and which are noted for their ability to destroy upon contact mechanical (air) foam produced with the use of foam-forming compositions heretofore known.

While heretofore and prior to the present invention, various foam-forming compositions have been successfully employed to produce mechanical (air) foam capable of extinguishing fires of the polar solvent type organic liquids having high capillary characteristics, such as that disclosed in the pending application of J. M. Perri and D. Y. Dollman, Serial No. 225,464, filed May 9, 1951, now abandoned, the composition of the present invention provides an all-purpose mechanical foam having added desirable characteristics not previously obtainable.

It is well known that foam-forming liquid produced from hydrolyzed proteinaceous material may be employed to produce a foam having highly desirable properties for the extinguishment of oil and gasoline fires, among such properties being the ability to produce the foam with any type of water, including sea water, and the ability to resist disintegration of the foam bubbles in the presence of intense heat.

United States Government specifications for an all-purpose fire-extinguishing foam-forming liquid require it to be such as will produce a stable, cohesive foam having a satisfactory degree of fluidity for the extinguishment of petroleum and ethyl alcohol fires, which consists of a mass of small bubbles not easily broken down by intense heat, which adheres to solid surfaces whether vertical or horizontal, which floats on petroleum and alcohol, which is not unduly corrosive to iron and steel and which is non-toxic and not irritating to the skin. In addition, such specifications require that the foam-forming liquid shall produce suitable foam with any available water irrespective of geographic location, including particularly sea water for the production of foam for extinguishing fires in ships at sea and in harbor installations. Further, the foam-forming liquid must not be impaired by storage for 72 hours at any temperature ranging from 160° F. to −65° F., and though the liquid may become frozen, upon its being thawed out, it must form foam with the same desirable characteristics as that of a liquid which had not been subjected to any extreme temperature conditions.

The above and other specifications of the United States Government of its designated Type V-foam-forming liquid are all more than adequately met by the composition of the present invention, it being among the objects of the present invention to provide a proteinaceous foam-forming liquid composition which is primarily suitable for the production of mechanical foam that is highly effective to extinguish fires of all organic liquids including those of the polar solvent type having high capillary properties; which produce mechanical foam that is not destructively affected by alcohol and other such organic liquids and that floats freely upon the surface thereof in such quantity as to provide an effective fire smothering blanket of foam; and which is adapted to be handled in exactly the same manner and by the same apparatus as is conventionally employed for producing mechanical foam ordinarily used for extinguishing oil and gasoline fires.

Other objects and advantages of the present invention will appear more fully hereinafter.

Ordinary mechanical foam as generally employed for the extinguishment of oil and gasoline fires, when applied to an alcohol or other organic liquid fire, almost immediately sinks to the bottom of such liquid at the same time that a large proportion of the foam is more or less completely disintegrated and broken up, due to the action of such liquid on the foam. This tendency for the foam to disintegrate upon contact with alcohol and other organic liquids of high capillary characteristics is overcome, in accordance with the present invention, by providing a stabilized proteinaceous base foam-forming solution which, when introduced into a flowing stream of water and admixed with air to produce mechanical or air foam, results in the formation of air-filled foam bubbles the wall of which are coated in continuous phase with a solid film of a water-insoluble heavy metal soap, thereby stabilizing the foam against the destructive action of liquids of the oxygen-containing polar solvent type. Preferably, in accordance with the present invention, the foam-forming solution is such as to produce an air-filled bubble the wall of which is formed of a continuous film of a water insoluble aluminum soap, although the stabilization may be effected by the formation of water-insoluble soaps of other metals, such as zinc, chromium, iron, nickel, cobalt and magnesium, and of alkaline earth metals, such as calcium.

In order that the foam-forming liquid be satisfactory for the mechanical production of fire-extinguishing foam, it is desirable that it be homogeneous, clear and free of all suspended matter and that it be capable of use with standard devices and apparatus conventionally employed in the production of foam. To these ends, the foam-forming solution of the present invention is prepared as will now be described, it being understood, of course, that the invention is not limited to the exact ingredients and proportions named and that variations from the same are possible without departing from the principles or real spirit of the invention.

In producing the foam-forming solution of the present invention, there is initially produced, in accordance with well-known conventional procedure, a proteinaceous hydrolysate obtained by the hydrolization of any suitable protein base material, an excellent example of such material being the soybean which may be processed to obtain the desired protein base hydrolysate as described in United States Letters Patent No. 2,269,958, granted January 13, 1942, and No. 2,413,667, granted December 31, 1946. Of course, any other suitable protein base material may be employed for production of the hydrolized protein solution which serves as the foam-forming agent of the liquid prepared in accordance with the present invention, such as albumen, dried blood, horn and hoof meal, peanut and cottonseed meal, and fish meal, from which the proteinaceous hydrolysate may be prepared ordinarily by dissolving the same in an aqueous alkaline solution.

In order to render the proteinaceous hydrolysate effective to produce foam suitable for the extinguishment of fires of organic liquids having high capillary properties, such as alcohols, esters and ketones, there is introduced into the initially prepared protein solution foam-stabilizing ingredients for strengthening the wall of the foam bubble and resisting its destruction by polar solvent liquids. The foam-stabilizing substances contained in the foam-forming liquid of the present invention are such as to produce a water-insoluble metal soap which, in the presence of the water employed in the production of the foam, envelops the foam bubbles to provide each with a continuous-phase surface film of insoluble solids impervious to destruction by alcohol and other liquids of the polar solvent type.

These foam-stabilizing substances consist of the organic salts of calcium, magnesium and such heavy metals as aluminum, zinc, chromium, iron, cobalt and nickel, in combination with fatty acids containing from 8 to 18 carbon atoms dissolved in an alkanol amine.

The metal organic salts referred to may be lactate, gluconate or citrate of aluminum, zinc, chromium, iron, cobalt, nickel, calcium or magnesium; the preferred fatty acids may be coconut (e. g., myristic acid or lauric acid or a mixture thereof); and the alkanol amine may be either mono, di or triethanolamine or a mixture thereof.

The organic salts of the heavy and alkaline earth metals above referred are per se insoluble in the aqueous proteinaceous hydrolysate which constitutes the principal part of the foam-forming liquid of the present invention and in order to prepare a clear solution of such liquid with the water-insoluble metal soap formed by combining the metal organic salts with the fatty acid solution, there is introduced into the hydrolysate a solubilizer for the metal soap, such solubilizer being preferably an alkylaryl sulfonate, e. g., di-isopropyl naphthalene sulfonate, sodium benzene sulfonate or toluene or xylene sulfonate. This solubilization of the metal soap in the proteinaceous hydrolysate is a most important feature of the present invention because it makes possible to the fullest extent utilization of the protein base hydrolysate as an all-purpose foam-forming liquid for producing mechanical foam capable of extinguishing fires of organic flammable liquids, including those of high capillary characteristics which are normally destructive of foam as produced with ordinary protein base foam-forming liquid. Thus, the liquid composition of the present invention has all the desirable attributes of protein base foam-forming liquids such as are conventionally used for the extinguishment of petroleum fires, in addition to which it has the added advantages above pointed out.

For the production of a foam-forming liquid in accordance with the present invention, the following formula is an example:

| | Percentage by weight |
|---|---|
| Hydrolized proteinaceous solution—(specific gravity, 1.170) | 14,000 grams (68%) |
| Di-isopropyl naphthalene sulfonate | 2,000 grams (9.7%) |
| Aluminum lactate | 600 grams (2.9%) |
| Methyl alcohol | 1,600 grams (7.7%) |
| Water | 1,600 grams (7.7%) |
| Coconut fatty acid | 480 grams (2.3%) |
| Triethanolamine | 360 grams (1.7%) |

In the above formula, the methyl alcohol and water are present as solvents for the solid materials which are introduced into the protein base solution. In lieu of the methyl alcohol and water, there may be employed for one or the other or both of these solvents either isopropyl alcohol, ethyl alcohol, ethylene glycol or propylene glycol or any combination thereof.

It will be understood that in place of aluminum lactate employed in the above example, other organic salts of aluminum and of other metals may be employed, such as aluminum gluconate or citrate, or zinc, chromium, iron, nickel, cobalt, calcium or magnesium lactate, gluconate or citrate.

It will also be understood that in place of di-isopropyl naphthalene sulfonate, other alkylaryl sulfonates may be employed as the solubilizer for the metal soap formed in the protein base liquid, such as sodium benzene sulfonate, toluene sulfonate or xylene sulfonate, while any other alkanol amine (e. g., mono or diethanol amine) may be substituted for the triethanolamine above mentioned as the solvent for the fatty acid.

Further, it will be understood by those skilled in the art that the proportions of ingredients may be varied within reasonable limits, it having been found that the proportions may vary as follows:

| | Percentage of total weight of foam-forming liquid |
|---|---|
| Protein hydrolysate | 50–70 |
| Solubilizer | 5–10 |
| Metal organic salt | 2–8 |
| Fatty acid | 2–4 |
| Alkanol amine | 1–3 |
| Solvents (combined) | 10–20 |

The essence of the present invention resides in the preparation of a protein base foam-forming liquid as above described which contains a solubilized metal soap which per se is insoluble in the water with which the liquid is combined to produce mechanical or air foam and which, when the liquid is mixed with water, deposits out of the liquid and envelops each bubble of the foam with a surface film of insoluble solids strongly resistant to destruction by alcohol and other liquids of high capillary characteristics.

The chemical and physical properties of the foam-forming liquid of the present invention are generally as follows: Specific gravity—1.162 at 70° F.; kinematic viscosity—25 centistokes at 60° F.; pH—6.2 average with a range of from 6 to 7 depending upon dilution with fresh or sea water; and pour point—10° F. The liquid forms a very good fire-extinguishing foam of adequate volume and stability when combined with water obtained from any geographic location, the volume of foam being well above the minimum specified by the United States Government for its designated Type V foam, namely, 125 gallons of foam per gallon of foam-forming liquid at 70° F.

While certain preferred embodiments of the present invention have been described, it will be quite apparent to those skilled in the art that various modifications and changes may be made from time to time without departing from the general principles or real spirit of the invention, and it will be understood accordingly that it is intended to claim the invention broadly, as well as specifically, as indicated by the appended claims.

What is claimed as new and useful is:

1. An alcohol-water base foam forming composition in clear solution formed by the admixture in said base of the following ingredients: a foamable proteinaceous hydrolysate, a fatty acid containing 8–18 carbon atoms, a metal organic salt reactable with the fatty acid to produce a water insoluble metal-fatty acid soap, the organic radical of said salt being chosen from the group consisting of lactate, gluconate, and citrate, an alkylaryl sulfonate as a solubilizer for the soap, and a lower alkanol amine as a solvent for the fatty acid; said ingredients being present approximately in the following percentages of the composition by weight: percentage of hydrolysate in said composition being equivalent to that had with 50% to 70% of said composition being an aqueous solution of hydrolysate of specific gravity 1.170, fatty acid 2% to 4% of said composition, salt 2% to 8% of said composition, solubilizer 5% to 10% of said composition, and fatty acid solvent 1% to 3% of said composition.

2. The composition as set forth in claim 1, wherein the fatty acid is a coconut fatty acid, the solubilizer is chosen from the group consisting of di-isopropyl naphthalene sulfonate, sodium benzene sulfonate, toluene sulfonate, and xylene sulfonate, and the amine is chosen from the group consisting of mono-, di-, and tri-ethanol amine.

3. A foam forming composition in clear solution formed by the admixture of a proteinaceous hydrolysate, di-isopropyl sulfonate, aluminum lactate, methyl alcohol, water, coconut fatty acid, and triethanol amine, in the approximate relationship by weight: percentage of hydrolysate in said composition being equivalent to that had with 68% of said composition being an aqueous solution of hydrolysate of specific gravity 1.170, sulfonate 9.7%, lactate 2.9%, alcohol 7.7%, water 7.7%, fatty acid 2.3%, and triethanol amine 1.7%.

References Cited in the file of this patent
UNITED STATES PATENTS

| | | |
|---|---|---|
| 2,154,231 | Daimler et al. | Apr. 11, 1939 |
| 2,405,538 | White | Aug. 6, 1946 |